United States Patent
Diehl et al.

(10) Patent No.: US 12,069,189 B2
(45) Date of Patent: *Aug. 20, 2024

(54) MEDIA CHANNEL MONITORING TO PROVE CONTENT PRESENTATION

(71) Applicants: SONY GROUP CORPORATION, Tokyo (JP); SONY PICTURES ENTERTAINMENT INC., Culver City, CA (US)

(72) Inventors: Eric Diehl, Culver City, CA (US); Timothy James Wright, London (GB)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,882

(22) Filed: Jan. 15, 2020

(65) Prior Publication Data
US 2020/0153643 A1 May 14, 2020

Related U.S. Application Data (63) Continuation of application No. 15/633,558, filed on Jun. 26, 2017, now Pat. No. 10,567,177.

(51) Int. Cl.
*G06F 21/00* (2013.01)
*H04L 9/06* (2006.01)
(Continued)

(52) U.S. Cl.
CPC .......... *H04L 9/3271* (2013.01); *H04L 9/0637* (2013.01); *H04L 9/0643* (2013.01);
(Continued)

(58) Field of Classification Search
CPC ... H04L 9/3271; H04L 9/3297; H04L 9/0643; H04L 9/0637; H04L 9/3215; H04L 2209/608; G06Q 2220/10; G06Q 30/0248
See application file for complete search history.

(56) References Cited

U.S. PATENT DOCUMENTS 8,150,096 B2  4/2012  Alattar
9,300,678 B1 *  3/2016  Stack .................. G06F 21/6218
(Continued)

FOREIGN PATENT DOCUMENTS

CN 106303715 A 1/2017
CN 106357612 A 1/2017
CN 106792267 A 5/2017

OTHER PUBLICATIONS

International Search Report and Written Opinion for International Patent Application No. PCT/US2018/035580 dated Aug. 16, 2018 in 8 pages.
(Continued)

Primary Examiner — Jorge L Ortiz Criado
Assistant Examiner — Kevin Ayala
(74) Attorney, Agent, or Firm — Procopio, Cory, Hargreaves & Savitch LLP (57) ABSTRACT

Blockchain-based proof of presentation of content on a media channel, including: generating, upon receiving a request to generate, at least first, second, and third parameters, wherein the first and second parameters are input parameters and the third parameter is calculated as an output parameter of a one-way cryptographic function; generating a first type of block by incorporating the first and third parameters into the first type of block; validating the first type of block and the blockchain; appending the first type of block to the blockchain when both the first type of block and the blockchain are declared valid; and embedding the second parameter into the content that is to be made available on the media channel to produce tainted content.

6 Claims, 7 Drawing Sheets

(51) Int. Cl.
*H04L 9/32* (2006.01)
*G06Q 30/0241* (2023.01)
*H04L 9/00* (2022.01)

(52) U.S. Cl.
CPC .......... *H04L 9/3215* (2013.01); *H04L 9/3236* (2013.01); *H04L 9/3297* (2013.01); *G06Q 30/0248* (2013.01); *G06Q 2220/10* (2013.01); *H04L 9/50* (2022.05); *H04L 2209/608* (2013.01)

(56) References Cited

U.S. PATENT DOCUMENTS

| | | | |
|---|---|---|---|
| 2007/0250195 A1* | 10/2007 | Rhoads | G06Q 30/02 |
| | | | 700/94 |
| 2010/0072950 A1 | 3/2010 | Tatebayashi et al. | |
| 2016/0212146 A1* | 7/2016 | Wilson | H04L 9/3226 |
| 2016/0292396 A1 | 10/2016 | Akerwall | |
| 2016/0315771 A1* | 10/2016 | Chalamala | H04L 9/3231 |
| 2016/0358165 A1* | 12/2016 | Maxwell | G06Q 20/0655 |
| 2016/0358253 A1* | 12/2016 | Liao | G06Q 40/04 |
| 2017/0046806 A1 | 2/2017 | Haldenby et al. | |
| 2017/0237569 A1* | 8/2017 | Vandervort | H04L 9/3247 |
| | | | 713/171 |
| 2018/0121635 A1* | 5/2018 | Tormasov | H04L 9/3236 |

OTHER PUBLICATIONS

Dominik Birk et al: "Using Digital Watermarking for Securing Next Generation Media Broadcasts", Advances in Machine Learning and Data Analysis : [International Conference on Advances in Machine Learning and Data Analysis ; Held in UC Berkeley, CA, USA, Oct. 22-24, 2008, Under the Auspices of the World Congress on Engineering and Computer S, vol. 48, Jan. 1, 2010 (Jan. 1, 2010), pp. 27-41, XP008169411, DOI: 10.1007/978-90-481-3177-8_3 ISBN: 978-90-481-3176-1 section 3.4.2.3.

Jeremy Clark et al: "CommitCoin: Carbon Dating Commitments with Bitcoin", Mar. 2, 2012 (Mar. 2, 2012), Financial Cryptography and Data Security, Springer Berlin Heidelberg, Berlin, Heidelberg, pp. 390-398, XP047013845, ISBN: 978-3-642-32945-6 the whole document.

Peter Todd: "Setting the record straight on Proof-of-Publication", Dec. 12, 2014 (Dec. 12, 2014), pp. 1-8, XP055779610, Retrieved from the Internet: URL:https://petertodd.org/2014/setting-the-record-proof-of-publication [retrieved on Feb. 24, 2021] the whole document.

\* cited by examiner

MEDIA CHANNEL MONITORING TO PROVE CONTENT PRESENTATION

CROSS-REFERENCE TO RELATED APPLICATIONS

The present application is a continuation application of co-pending U.S. patent application Ser. No. 15/633,558 (filed Jun. 26, 2017). The disclosure of the above-referenced patent application is incorporated herein by reference.

BACKGROUND

Field of the Disclosure

The present disclosure relates to proving that content was presented, and more specifically, to monitoring of a media channel to provide a blockchain-based proof of presentation of the content on the media channel.

Background

It is sometimes important for a publisher to prove that it made available a piece of content on a given media at a given time. For example, a broadcaster may want to prove that it broadcasted a given advertisement on a given channel at a given time. One conventional configuration monitors the media channel, detects the piece of content, and reports the detection to a central server, which maintains a log of all detections. However, in such a configuration, there are many potential points of attack for a malicious publisher to fraudulently report detections.

SUMMARY

The present disclosure provides for providing a blockchain-based proof of presentation of content on a media channel.

In one implementation, a system for blockchain-based proof of presentation of content on a media channel is disclosed. The system includes: a blockchain; a generator configured to generate at least first, second, and third parameters, wherein the first and second parameters are input parameters and the third parameter is calculated as an output parameter of a one-way cryptographic function, the generator configured to incorporate the first and third parameters into a first type of block and append the first type of block to the blockchain; an embedder configured to receive and embed the second parameter into the content to produce tainted content; and a probe configured to monitor the media channel for the tainted content and to extract the second parameter from the tainted content.

In another implementation, a method for providing a blockchain-based proof of presentation of content on a media channel is disclosed. The method includes: generating, upon receiving a request to generate, at least first, second, and third parameters, wherein the first and second parameters are input parameters and the third parameter is calculated as an output parameter of a one-way cryptographic function; generating a first type of block by incorporating the first and third parameters into the first type of block; validating the first type of block and the blockchain; appending the first type of block to the blockchain when both the first type of block and the blockchain are declared valid; and embedding the second parameter into the content that is to be made available on the media channel to produce tainted content.

In a further implementation, a method for providing a blockchain-based proof of presentation of content on a media channel using a blockchain including first and second types of block is disclosed. The method includes: monitoring the media channel to detect the tainted content; extracting a second parameter from the tainted content; extracting first and third parameters from the first type of block in the blockchain, wherein the first and second parameters are input parameters and the third parameter is calculated as an output parameter of a one-way cryptographic function; testing the one-way function using the first, second, and third parameters; repeating the extracting first and third parameters step and the testing step, if the testing step fails; generating the second type of block including the second and third parameters, if the testing step passes; validating the second type of block and the blockchain; and appending the second type of block to the block chain when both the second type of block and the blockchain are declared valid.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, a publisher may want to prove that it made available a piece of content (e.g., video, audio, document, or any other type of digital information) on a given media channel at a given time. However, it may be difficult to provide a proof that is non-refutable and easily verifiable.

Certain implementations of the present disclosure provide an alternative solution that offers a more robust configuration using a blockchain technology. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

The alternative solution that offers a more robust configuration is based on providing at least two elements including: a mathematical proof that a "probe" accessed the piece of content; and a blockchain that logs all proofs of the probe. The mathematical proof uses a one-way function that is easy to calculate, but computationally difficult to revert (i.e., find a set of input(s) that produced a particular output). In one implementation, the one-way function is a one-way cryptographic function. Thus, for each content to be detected, at least three parameters are produced including Challenge (ch), Proof (prf), and Identity (ID). These parameters verify the following equation:

$$f(ch_i, prf_i) = ID_i \quad [1]$$

where f is the one-way cryptographic function.

A blockchain data structure is an ordered list of blocks. Each block points back securely to its predecessor until the first block in the blockchain (usually referred to as the "genesis" block) is reached. The blocks and their sequencing are protected in integrity by backward-linking of cryptographic hashes.

Figure 1:
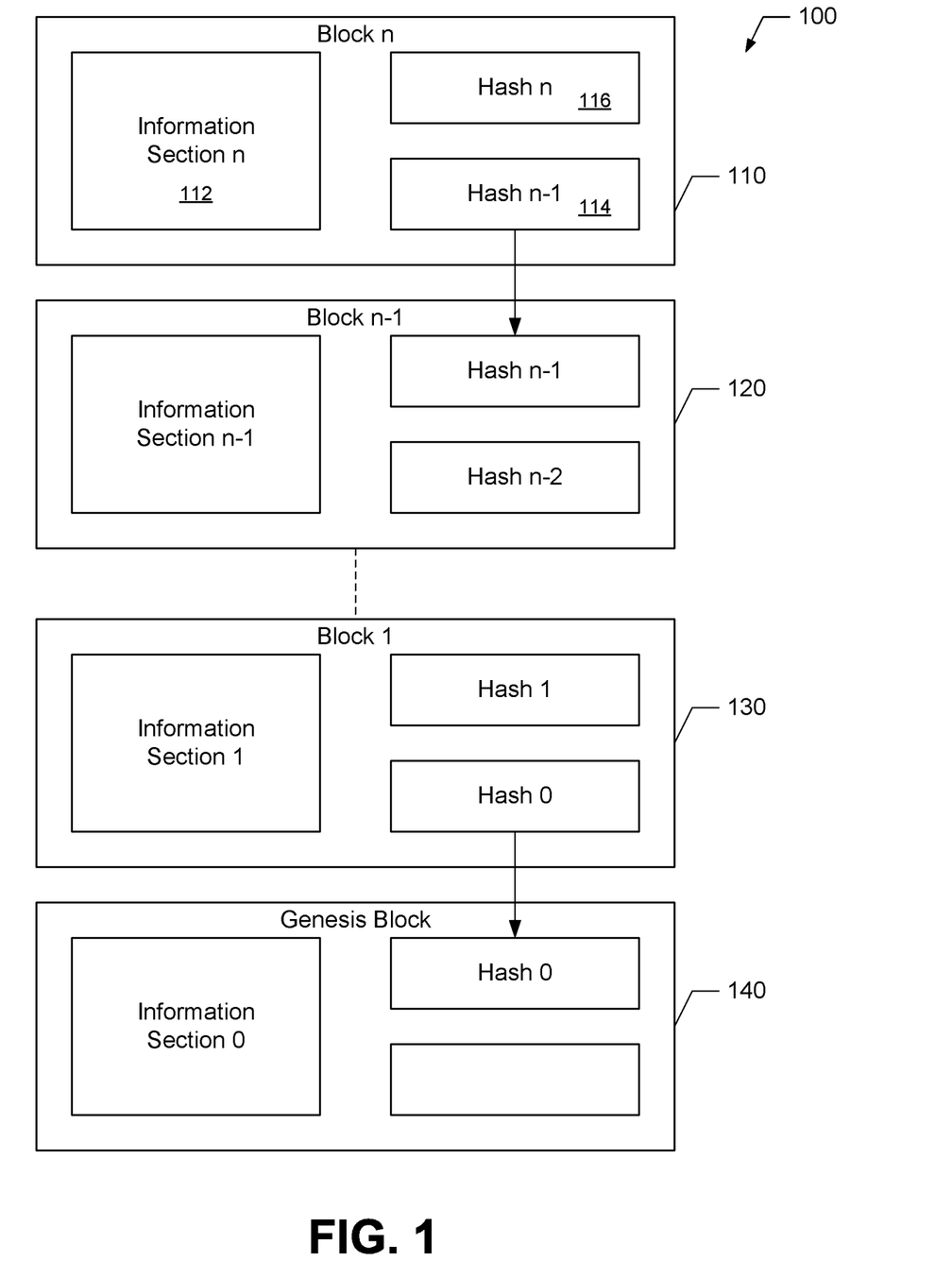
FIG. 1 is a block diagram of a blockchain including n blocks and a genesis block.

FIG. 1 is a block diagram of a blockchain 100 including n blocks 110, 120, 130 and a genesis block 140. In one implementation, a block has at least three elements: (a) an information section (e.g., 112) that stores the registered data and ancillary data, the information section may be signed to prove its authenticity; (b) the cryptographic hash (e.g., 114) of the previous block (the genesis block will not have a previous block); and (c) the cryptographic hash (e.g., 116) of the current block. Thus, the data structure of the blockchain provides an append-only global log, which is tamper evident.

Figure 2:
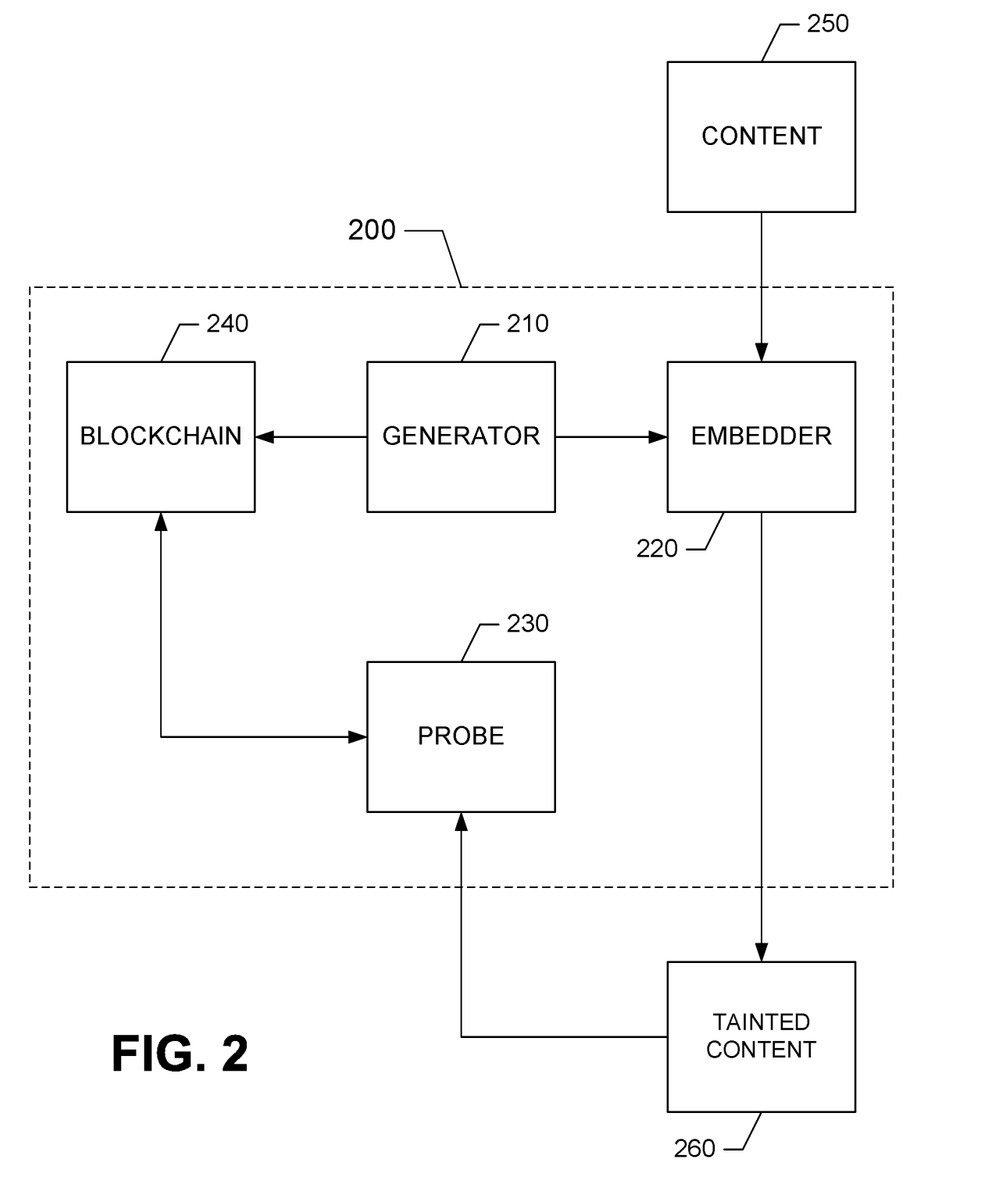
FIG. 2 is a block diagram of a blockchain-based proof of presentation system in accordance with one implementation of the present disclosure.

FIG. 2 is a block diagram of a blockchain-based proof of presentation system 200 in accordance with one implementation of the present disclosure. The blockchain-based proof of presentation system 200 of FIG. 2 includes a generator 210, an embedder 220, a probe 230, and a blockchain 240.

In the illustrated implementation of FIG. 2, the generator 210 generates, on demand, parameters including Challenge (e.g., a first parameter), Proof (e.g., a second parameter), and Identity (e.g., a third parameter). The generator 210 generates parameters Challenge and Proof as first and second random numbers, respectively. The generator 210 then calculates Identity using Equation [1] shown above, which indicates that Identity is a function of both parameters Challenge and Proof. The generator 210 sends parameter Proof to the embedder 220. The generator 210 also incorporates parameters Challenge and Identity into an information section and appends the block to the blockchain 240.

As stated above, f in Equation [1] is a one-way function that is easy to calculate, but computationally difficult to revert. In one implementation, the one-way function of Equation [1] is a Secure Hash Algorithm (SHA) such as the SHA-256 algorithm. This algorithm generates a pseudorandom, fixed size 256-bit hash, which cannot be reversed. That is, the one-way function such as SHA is easier to calculate than it is to revert. This means that Identity (which is an output of the function) is easy to calculate using both input parameters Challenge and Proof, but it is difficult to calculate with only one input parameter. That is, Equation [1] makes it difficult to calculate one of the two input parameters using the other input parameter and the output parameter. Thus, by separating the two input parameters with one input parameter (e.g., second parameter Proof) made available only in the tainted content on the media channel and the other input parameter (e.g., first parameter Challenge) in the blockchain, the confirmation of the presentation of the content can be validated by extracting the missing input parameter (i.e., second parameter Proof) from the tainted content and applying Equation [1] to obtain output parameter Identity.

The embedder 220 receives parameter Proof from the generator 210 and embeds or inserts the parameter into the content 250 (e.g., an advertisement) that is to be made available on a media channel and to be detected. The insertion can be, for example, by adding Proof as metadata, or in the case of audiovisual material, by adding an imperceptible watermark whose payload is Proof. Thus, the embedder 220 receives the content 250 and embeds the parameter (i.e., Proof) to produce the tainted content 260. The probe 230 monitors the media channel for the tainted content 260 and attempts to extract Proof from the tainted content 260.

In the illustrated implementation of FIG. 2, both the generator 210 and the probe 230 can add new blocks to the blockchain 240. In one implementation, the blockchain 240 of the blockchain-based proof of presentation system 200 may include at least two types of blocks, a challenge block and a proof block. In one implementation, only the generator 210 can append the challenge block to the blockchain 240, while only the probe 230 can append the proof block to the blockchain 240.

Figure 3A:
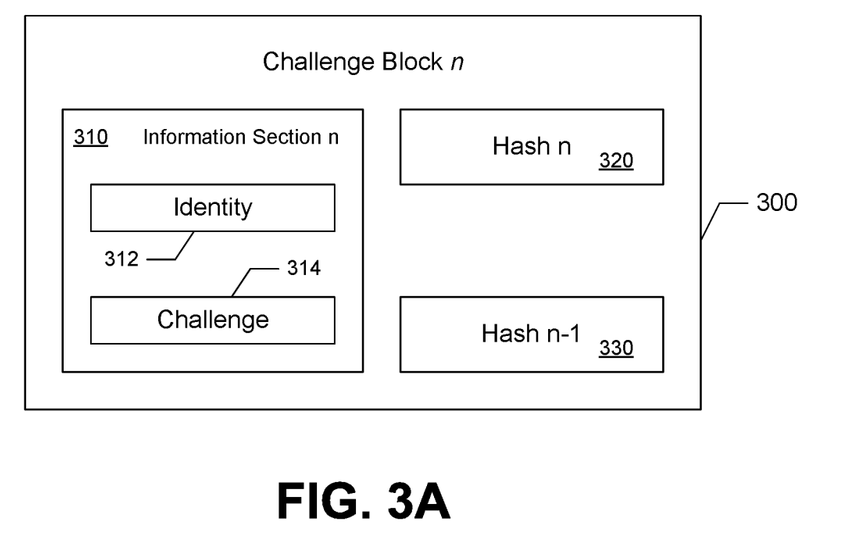
FIG. 3A is a block diagram of a challenge block in accordance with one implementation of the present disclosure.

FIG. 3A is a block diagram of a challenge block 300 in accordance with one implementation of the present disclosure. As with any block of a blockchain, the challenge block 300 includes the information section 310, the hash of the current block 320, and the hash of the previous block 330. Further, the information section 310 of the challenge block 300 includes parameters Identity 312 and Challenge 314. In one implementation, only the generator 210 can append the challenge block 300 to the blockchain 240.

Figure 3B:
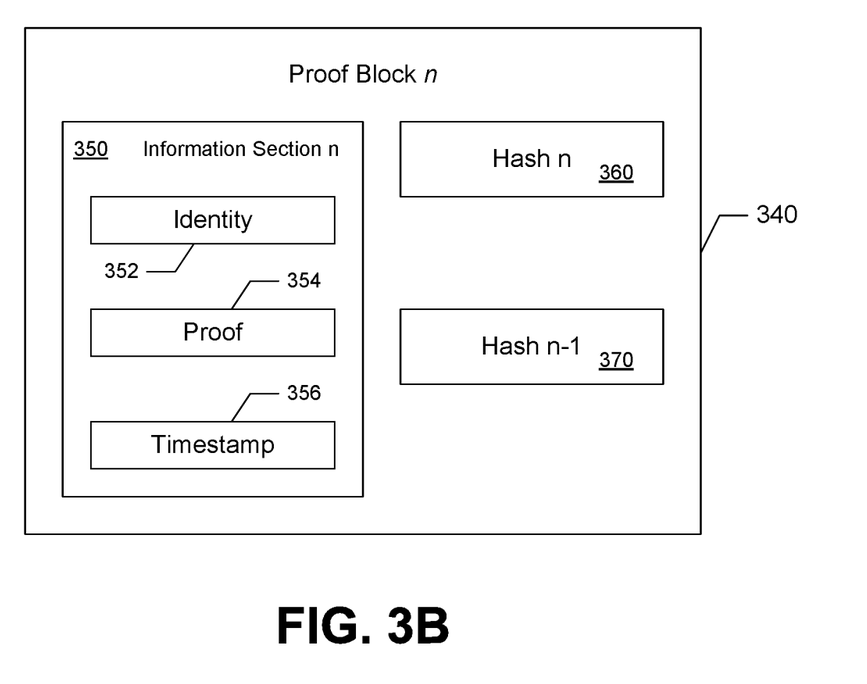
FIG. 3B is a block diagram of a proof block in accordance with one implementation of the present disclosure.

FIG. 3B is a block diagram of a proof block 340 in accordance with one implementation of the present disclosure. As with any block of a blockchain, the proof block 340 also includes the information section 350, the hash of the current block 360, and the hash of the previous block 370. Further, the information section 350 of the proof block 340 includes parameters Identity 352, Proof 354, and Timestamp 356. In one implementation, only the probe 230 can append the proof block 340 to the blockchain 240.

Figure 4A:
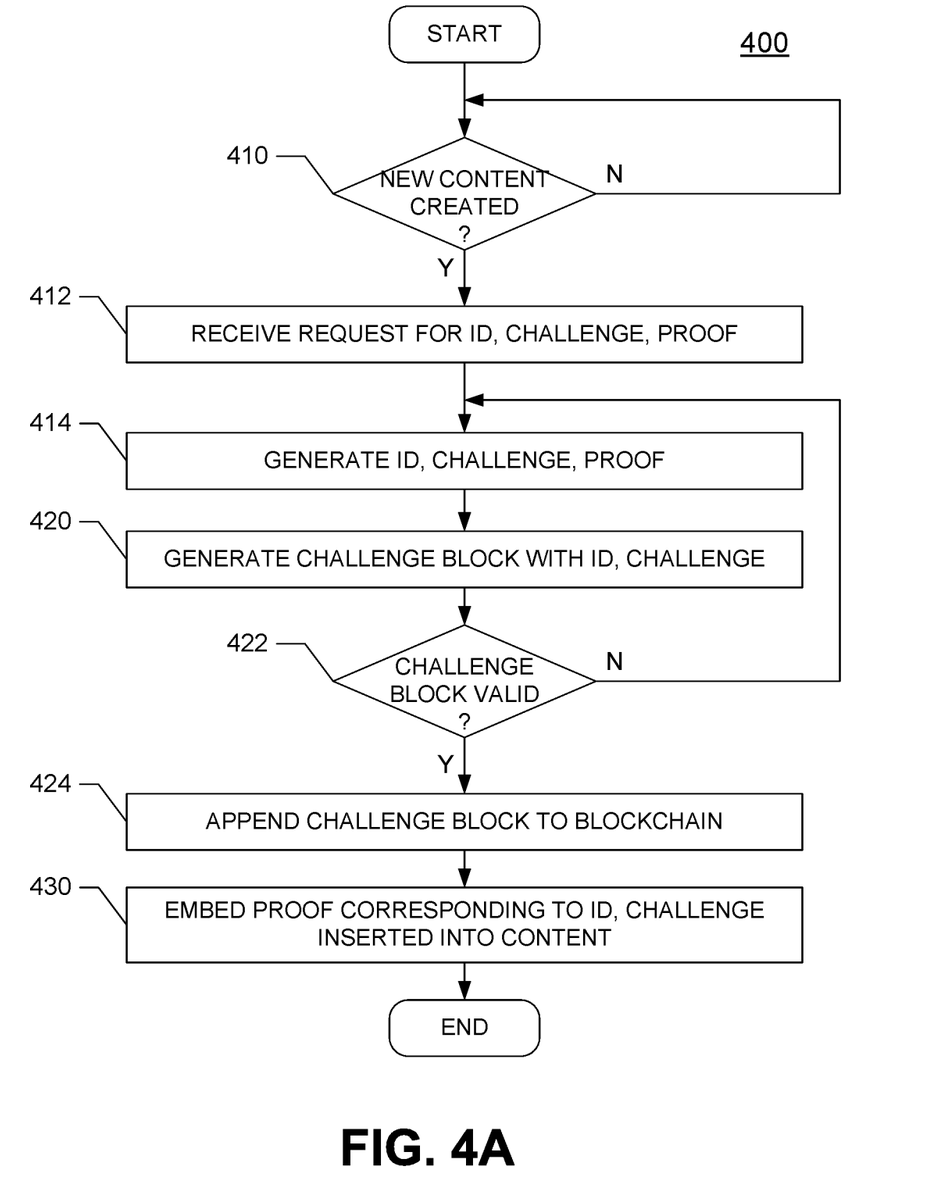
FIG. 4A is a flow diagram illustrating a first stage process for providing a blockchain-based proof of the presentation of content on a media channel in accordance with one implementation of the present disclosure.

FIG. 4A is a flow diagram illustrating a process 400 for providing a blockchain-based proof of the presentation of content on a media channel in accordance with one implementation of the present disclosure. In one implementation, when a new content 250 is created (e.g., by a publisher), at box 410, a request is received (e.g., at the generator 210), at box 412, to issue at least three parameters Identity, Challenge, and Proof. The parameters are generated, at box 414.

A challenge block 300 including Identity 312 and Challenge 314 is generated (e.g., by the generator 210), at box 420. The challenge block 300 is then validated, at box 422. The validation of the challenge block 300 includes verifying that the blockchain is valid and that the challenge block 300 is valid. In one implementation, the blockchain 240 can be declared valid when the hashes 320, 330 are consistent. In another implementation, the challenge block 300 can be declared valid when there is no previous challenge block with a same value of parameter Identity 312 in the blockchain. If the challenge block 300 cannot be validated, at box 422, the process 400 is repeated with the generation of a new set of three parameters, at box 414. Otherwise, if the challenge block 300 is validated, at box 422, the generated challenge block 300 is appended to the blockchain 240, at box 424. Further, parameter Proof 354 (corresponding to parameters Identity 312 and Challenge 314 inserted into the challenge block 300) is embedded into the content, at box 430.

Figure 4B:
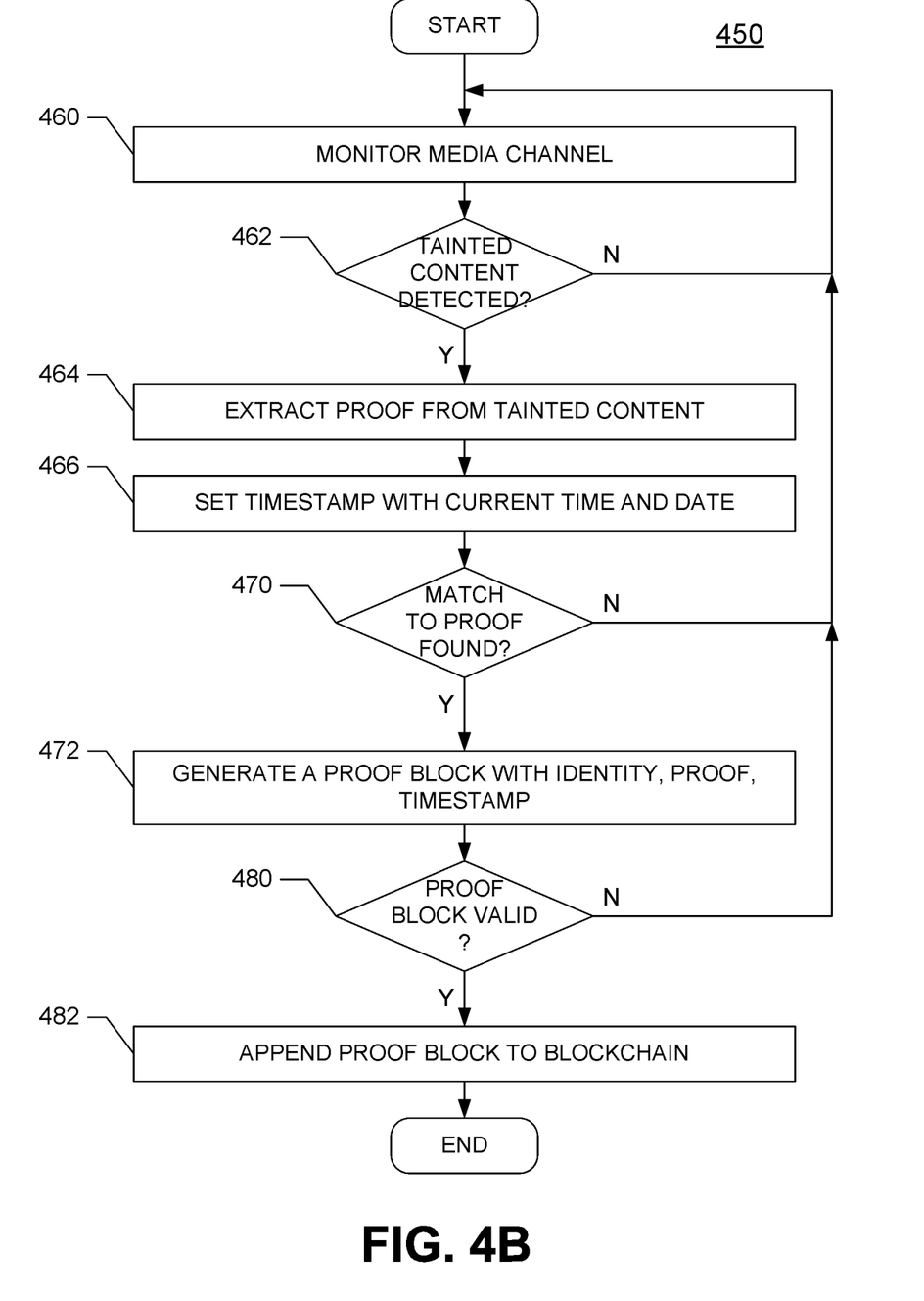
FIG. 4B is a flow diagram illustrating a process for providing a blockchain-based proof of the presentation of content on a media channel in accordance with another implementation of the present disclosure.

FIG. 4B is a flow diagram illustrating a process 450 for providing a blockchain-based proof of the presentation of content on a media channel in accordance with another implementation of the present disclosure. In one implementation, a media channel is monitored (e.g., by the probe 230), at box 460, to detect the potential tainted content 260. When the potential tainted content 260 is detected, at box 462, parameter Proof is extracted from the tainted content 260 (e.g., by the probe 230), at box 464. The timestamp is set (e.g., by the probe 230), at box 470, with the value of current time and date. The time stamp proves that the tainted content was accessed at a given time. In one implementation, this information is important for the publisher that it shows the publisher satisfied the obligated schedule.

Once Proof is extracted from the tainted content 260, at box 464, and the timestamp is set, at box 466, challenge blocks in the blockchain 240 are then tested (e.g., by the probe 230), at box 470, until parameters Identity and Challenge (which are extracted from a current challenge block of the blockchain) match extracted Proof (e.g., by satisfying the result of the one-way cryptographic function shown in Equation [1]). Once a matching challenge block is found, at box 470, a new proof block, including Identity, Proof, and timestamp, is generated (e.g., by the probe 230), at box 472.

The newly-generated proof block 340 is then tested for validity, at box 480, and if it determined that the proof block is valid, the proof block 340 is appended to the blockchain, at box 482. The process of validating the proof block 340 also includes verifying that the blockchain is valid. In one implementation, the blockchain 240 can be declared valid when the hashes 320, 330 are consistent. In another implementation, the proof block 340 can be declared valid if there is only one proof block in the blockchain with corresponding parameter Identity 312 which, along with parameters Challenge and Proof, satisfies Equation [1]. If the proof block 340 cannot be validated, at box 480, the process 400 returns to box 460 for the detection of a new tainted content.

Figure 5:
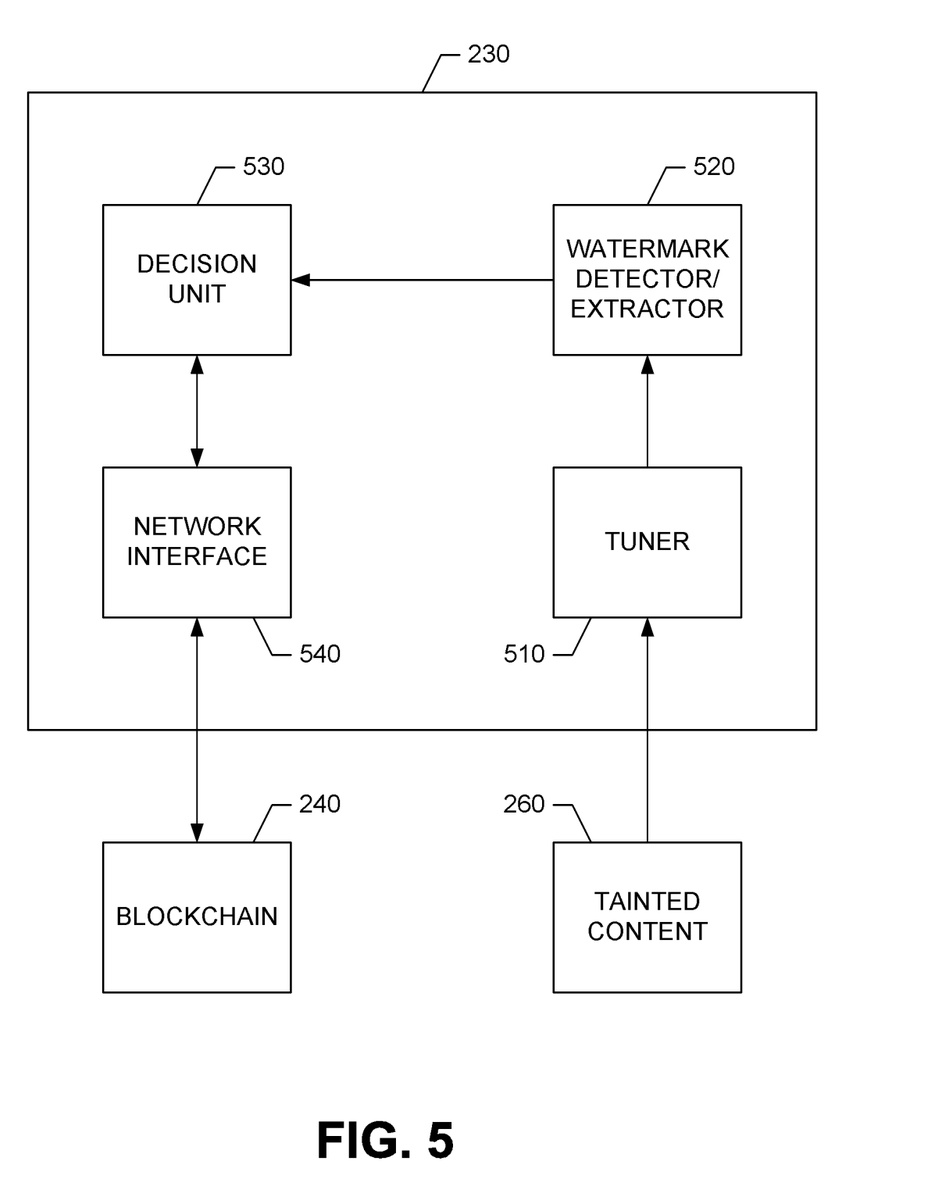
FIG. 5 is a block diagram of the probe in accordance with one implementation of the present disclosure.

FIG. 5 is a block diagram of the probe 230 in accordance with one implementation of the present disclosure. In illustrated implementation of FIG. 5, the media channel being monitored by the probe 230 is a broadcast channel, and includes a tuner 510, a watermark detector/extractor 520, a decision unit 530, and a network interface 540. Accordingly, the probe 230 receives the tainted content 260 from the broadcast channel through the tuner 510. The received tainted content 260 is then passed to the watermark detector/extractor 520 that attempts to detect and extract the payload of the received tainted content 260. The decision unit 530 accesses the blockchain 240 through the network interface 540 such as an Ethernet TCP/IP stack. In one implementation, the decision unit 530 then tests challenge blocks in the blockchain 240 until parameters Identity and Challenge in a challenge block match extracted payload Proof (e.g., by satisfying the result of the one-way function shown in Equation [1]). Once the decision unit 530 finds a matching challenge block, the decision unit 530 generates a new proof block including Identity, Proof, and timestamp. The new proof block is sent to the blockchain 240 through the network interface 540 to be appended to the blockchain 240.

Figure 6:
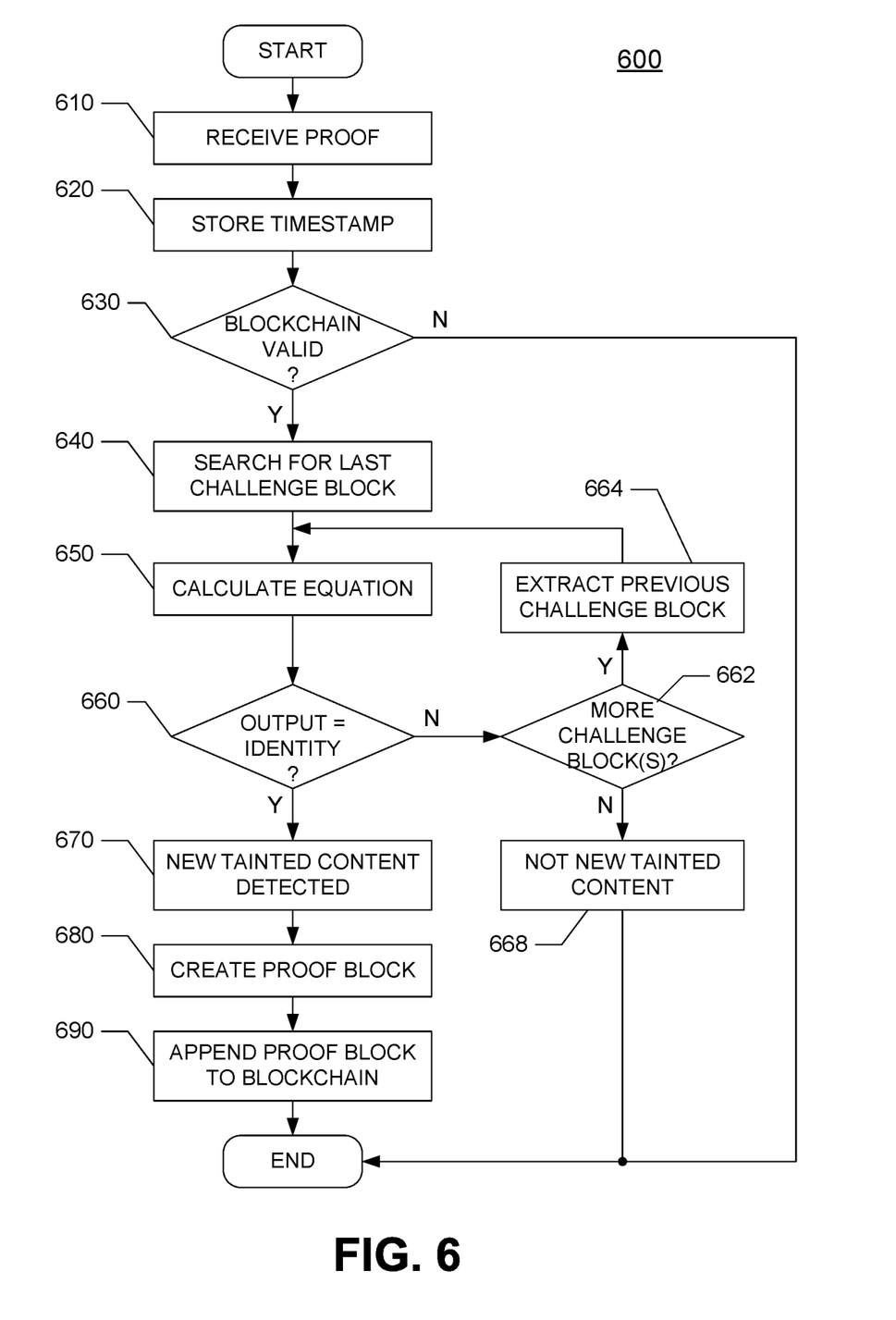
FIG. 6 is a flow diagram illustrating a process performed by the decision unit in monitoring the broadcast channel and generating a proof of the presentation of the content on the broadcast channel in accordance with one implementation of the present disclosure.

FIG. 6 is a flow diagram illustrating a process 600 performed by the decision unit 530 in monitoring the broadcast channel and generating a proof of the presentation of the content on the broadcast channel in accordance with one implementation of the present disclosure. In one implementation, the payload (i.e., Proof) of the tainted content 260 is received, at box 610. A timestamp, including the current time and date, is stored, at box 620.

At box 630, validation of the blockchain 240 is performed. In one implementation, the blockchain 240 can be declared valid when the hashes 320, 330 are consistent. Otherwise, the blockchain 240 is declared invalid and the process 600 is aborted. If the blockchain 240 is declared valid, at box 630, the last challenge block in the blockchain 240 is searched, at box 640. Parameters Challenge and Identity are extracted from the last challenge block and the parameters are entered into the one-way cryptographic function (e.g., Equation [1]) along with extracted parameter Proof, at box 650, to verify whether the function is satisfied. If the determined condition of the one-way cryptographic function is not satisfied, at box 660, a determination is made, at box 662, whether there is more challenge block(s). If there is more challenge block(s), then the previous challenge block is extracted, at box 664, and the process returns to box 650. Otherwise, the received content is declared as not being tainted content 260, at box 668, and the process 600 aborts.

Otherwise, if the determined condition of the one-way cryptographic function is satisfied, at box 660, then the received content is determined to be tainted content 260 with Proof 354 being the payload, at box 670. Further, the satisfaction of the condition of the one-way cryptographic function, at box 660, indicates that the proof block 340 is valid. The process 600 next checks to determine if there is not already a proof block 340 in the blockchain 240 with same value of parameter Identity. If it is the case, then the tainted content 260 was already detected once and the process 600 is aborted. Otherwise, if there is not already a proof block 340 in the blockchain 240 with same value of parameter Identity, a new proof block 340 is generated with parameters Identity 352 and Proof 354, at box 680, and the new proof block 340 is appended to the blockchain 240, at box 690.

The foregoing methods and systems are susceptible to many variations. Additionally, for clear and brief description, many descriptions of the methods and systems have been simplified. Many descriptions use terminology and structures of specific standards. However, the disclosed methods and systems are more broadly applicable.

Those of skill in the art will appreciate that the various illustrative logical blocks, units, and steps described in connection with the implementations disclosed herein can often be implemented as electronic hardware, computer software, or combinations of both. To clearly illustrate this interchangeability of hardware and software, various illustrative components, blocks, units, and steps have been described generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the present disclosure. In addition, the grouping of functions within a unit, component, block, or step is for ease of description. Specific functions or steps can be moved from one unit, component, or block without departing from the scope of the disclosure.

The steps of a method and the processes of a block or unit described in connection with the implementations disclosed herein can be implemented directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or units that are described as coupled may be coupled via intermediary device, blocks, or units.

The above description of the disclosed implementations is provided to enable any person skilled in the art to make or use the described disclosure. Various modifications to these implementations will be readily apparent to those skilled in the art, and the generic principles described herein can be applied to other implementations without departing from the scope of the disclosure. For example, while the above examples focus on blockchains, any structure similar in function to the blockchains can be used. Further, even a secure storage unit can be used in place of the blockchains. Accordingly, the techniques are not limited to the specific examples described above. Thus, it is to be understood that the description and drawings presented herein represent different implementations of the present disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for providing a blockchain-based proof of presentation of content on a media channel based on a blockchain, the method comprising:
   generating, upon receiving a request to generate, at least first, second, and third parameters,
   wherein the first and second parameters are input parameters and the third parameter is calculated as an output parameter of a one-way cryptographic function;
   generating a first type of block by incorporating the first and third parameters into the first type of block;
   validating the blockchain by determining that all hashes included in the first type of block of the blockchain are consistent;
   validating the first type of block by determining that there is no previous first type of block with a same value of a third parameter in the blockchain;
   appending the first type of block to the blockchain when both the first type of block and the blockchain are declared valid;
   receiving the content;
   embedding the second parameter into the content that is to be made available on the media channel to produce tainted content; and
   monitoring the media channel for the tainted content and extracting the second parameter from the received tainted content using a probe;
   extracting the first and third parameters from the first type of block of the blockchain;
   performing a test on a condition of the one-way cryptographic function using the first and third parameters extracted from the first type of block of the blockchain and the second parameter extracted from the tainted content; and
   accessing the blockchain and test challenge blocks in the blockchain until the first and third parameters in a challenge block matches the extracted second parameter by meeting the condition of the test of the one-way cryptographic function.

2. The method of claim 1, wherein the first and second parameters are generated as pseudo-random numbers.

3. The method of claim 1, wherein embedding the second parameter comprises
   embedding the second parameter into the content as metadata.

4. The method of claim 1, wherein embedding the second parameter comprises
   embedding the second parameter into the content by adding an imperceptible watermark whose payload is the second parameter.

5. The method of claim 1, wherein the content is an advertisement.

6. The method of claim 1, further comprising generating a second type of block, incorporating the first and second parameters into an information section of the second type of block, and appending the second type of block to the blockchain, when the test meets the condition of the one-way cryptographic function.

* * * * *